United States Patent
Zarev (10) Patent No.: US 7,119,294 B2
(45) Date of Patent: Oct. 10, 2006

(54) SWITCH WITH CONCENTRIC CURVILINEAR HEATER RESISTOR

(75) Inventor: Sasko Zarev, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 11/323,842

(22) Filed: Dec. 29, 2005

(65) Prior Publication Data

US 2006/0109317 A1    May 25, 2006

Related U.S. Application Data

(62) Division of application No. 10/637,263, filed on Aug. 8, 2003.

(51) Int. Cl.
   *H01H 29/00* (2006.01)

(52) U.S. Cl. ........................................ 200/182; 200/193

(58) Field of Classification Search ........ 200/182–193, 200/214, 221, 233, 227, 228; 219/209, 210, 219/528, 543, 549; 310/328, 363, 365
See application file for complete search history.

(56) References Cited

U.S. PATENT DOCUMENTS

| | | |
|---|---|---|
| 4,490,728 A | 12/1984 | Vaught et al. |
| 4,965,594 A | 10/1990 | Komuro |
| 5,204,689 A | 4/1993 | Shirato et al. |
| 5,754,194 A | 5/1998 | Endo et al. |
| 5,763,059 A | 6/1998 | Yamaguchi et al. |
| 6,120,135 A | 9/2000 | Murthy et al. |
| 6,323,447 B1 * | 11/2001 | Kondoh et al. ............. 200/182 |
| 6,373,356 B1 * | 4/2002 | Gutierrez et al. ............. 335/47 |
| 6,471,340 B1 | 10/2002 | Meyer |
| 6,489,084 B1 | 12/2002 | Pidwerbecki et al. |
| 6,527,378 B1 | 3/2003 | Rausch et al. |
| 6,540,334 B1 | 4/2003 | Mrvos et al. |
| 6,559,420 B1 * | 5/2003 | Zarev ......................... 219/209 |
| 6,750,594 B1 | 6/2004 | Wong |

* cited by examiner

*Primary Examiner*—Michael Friedhofer
*Assistant Examiner*—Lisa Klaus (57) ABSTRACT

In one embodiment, first and second mated substrates of a switch define there between at least portions of a number of cavities. A switching fluid is held within one or more of the cavities and is moveable between at least first and second switch states in response to forces that are applied to the switching fluid. An actuating fluid is also held within one or more of the cavities and serves to apply the forces to the switching fluid. First and second electrical contacts are supported by the second of the mated substrates. A concentric curvilinear heater resistor is deposited on the second substrate and couples the first and second electrical contacts. The concentric curvilinear heater resistor is positioned such that it contacts the actuating fluid within one of the aforementioned cavities that hold the actuating fluid. Other embodiments are also disclosed.

16 Claims, 6 Drawing Sheets

SWITCH WITH CONCENTRIC CURVILINEAR HEATER RESISTOR

CROSS-REFERENCE TO RELATED APPLICATION

This is a divisional of copending application Ser. No. 10/637,263 filed on Aug. 8, 2003, the entire disclosure of which is incorporated into this application by reference.

BACKGROUND

Heater resistors are commonly used to provide thermal actuation or heating of a fluid that is in contact with the heater resistor. By way of example, when pulsed with a voltage pulse, the surface of the heater resistor heats and transfers thermal energy to the fluid. The fluid, heated by the thermal energy provided by the heater resistor, is then activated to perform its designated function, depending on its intended purpose.

Unfortunately, during this process, thermal energy may be lost to the circuit substrate rather than being transferred to the actuating fluid. This loss of thermal energy reduces the performance of the actuating fluid and may reduce the over-all efficiency of the circuit. Moreover, due to the uneven distribution of thermal energy at the onset of the voltage pulse and subsequent uneven dissipation of thermal energy at the conclusion of the voltage pulse, the heater resistor and its circuit substrate are subjected to varying tensile and compressive stresses which may lead to premature degradation of both.

SUMMARY OF THE INVENTION

In one embodiment, a switch comprises first and second mated substrates that define there between at least portions of a number of cavities. A switching fluid is held within one or more of the cavities and is moveable between at least first and second switch states in response to forces that are applied to the switching fluid. An actuating fluid is also held within one or more of the cavities and serves to apply the forces to the switching fluid. First and second electrical contacts are supported by the second of the mated substrates. A concentric curvilinear heater resistor is deposited on the second substrate and couples the first and second electrical contacts. The concentric curvilinear heater resistor is positioned such that it contacts the actuating fluid within one of the afore-mentioned cavities that hold the actuating fluid.

Other embodiments are also disclosed.

BRIEF DESCRIPTION OF THE DRAWINGS

Illustrative embodiments of the invention are illustrated in the drawings, in which.

DETAILED DESCRIPTION

In the liquid metal micro switch (LIMMS) field of manufacture, the expansion of actuating fluid (e.g., an inert gas or liquid) surrounding the heater resistor located inside the heater cavity provides the necessary pressure increase to cause the LIMMS device to switch. The expansion of the actuating fluid is a result of transfer of thermal energy from the heater resistor to the actuating fluid as initiated by a voltage pulse. Unfortunately, a significant amount of thermal energy produced by the typical thick-film and thin-film rectangular-shaped heater resistor is lost through heat dissipation to the circuit substrate rather than transfer to the actuating fluid itself. This loss and the amount of thermal energy transferred to the actuating fluid are directly proportional to the amount of surface area of the circuit substrate that is covered by the rectangular heater resistor and the amount of parasitic interface area between the rectangular heater resistor and the circuit substrate. Presently disclosed herein is a concentric curvilinear heater resistor that by nature of its concentricity and curvilinear shape covers a smaller surface area of the circuit substrate than the typical rectangular-shaped heater resistor, therefore providing a reduced parasitic interface and an increased surface current.

Figure 1:
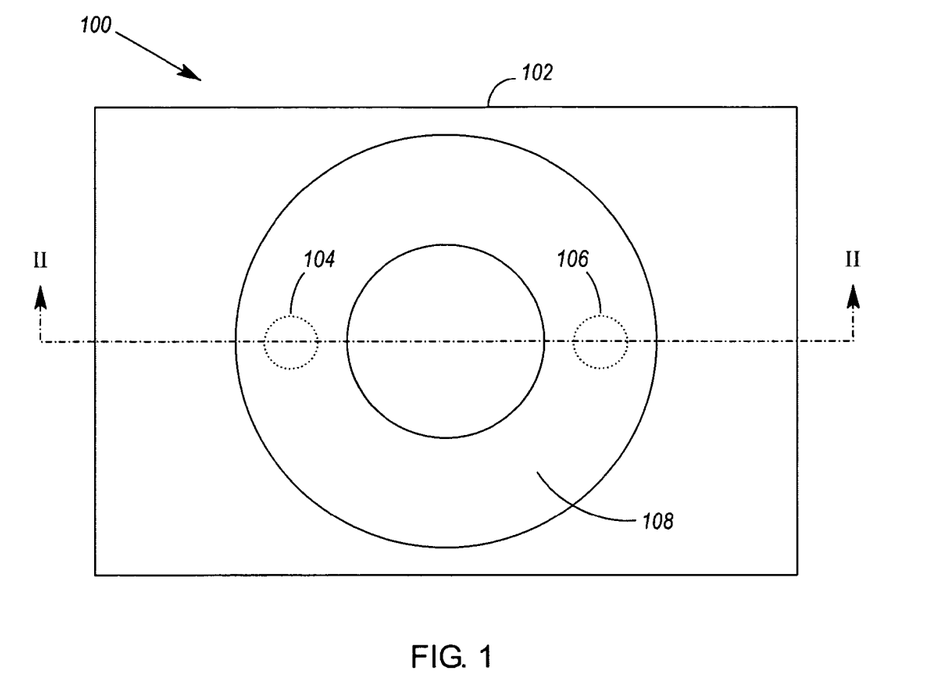
FIG. 1 illustrates an exemplary plan view of a circular-shaped (or ring-shaped) concentric curvilinear heater resistor.
Figure 2:
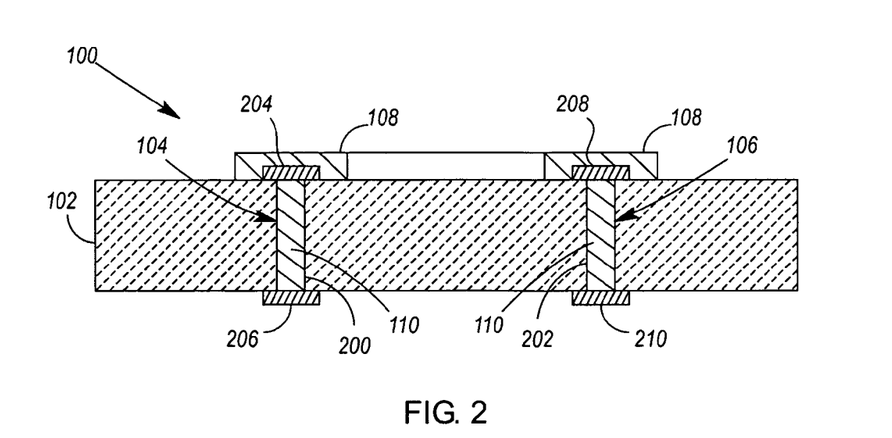
FIG. 2 is a cross-sectional view of the circular-shaped concentric curvilinear heater resistor shown in FIG. 1.

A concentric curvilinear heater resistor apparatus 100 is shown in FIGS. 1 and 2. Apparatus 100 comprises a substrate 102 having a first hole or via 200 and a second hole or via 202 mounted to substrate 102. Substrate 102 may be comprised of any material capable of sustaining high heat resistance such as mulite, low temperature co-fired ceramic (LTCC), aluminum nitride, alumina, silica, or glass. Mulite, LTCC or alumina are preferred in some embodiments because of their low thermal conductivities and RF electrical properties (good dielectric constant). First and second holes or vias 200, 202 may be punched or laser-drilled into the substrate 102 while the substrate 102 is in a "green tape" state. Other methods of forming vias 200 and 202 as known to one of ordinary skill in the art are also contemplated herein. The width of first via 200 and second via 202 may be in the range of 6–8 mils. First via 200 and second via 202 are filled with a metallic paste 110 suitable for exposure to high temperatures. The metallic paste 110 may be comprised of silver, tungsten or platinum. Tungsten is preferred in some embodiments because of its good electrical conductivity. First via 200 and second via 202 are capped above and below substrate 102 with a minimally resistive material 204, 206, 208, 210 such as platinum or nickel, forming first electrical contact 104 and second electrical contact 106, respectively. Platinum is preferred because it is compatible with the liquid metal that it interfaces with. A heater resistor 108 is coupled to first and second electrical contacts 104 and 106. Heater resistor 108 may be deposited on substrate 102 by various methods, including thick-film and thin-film methods as will be described in more detail herein.

Figure 3:
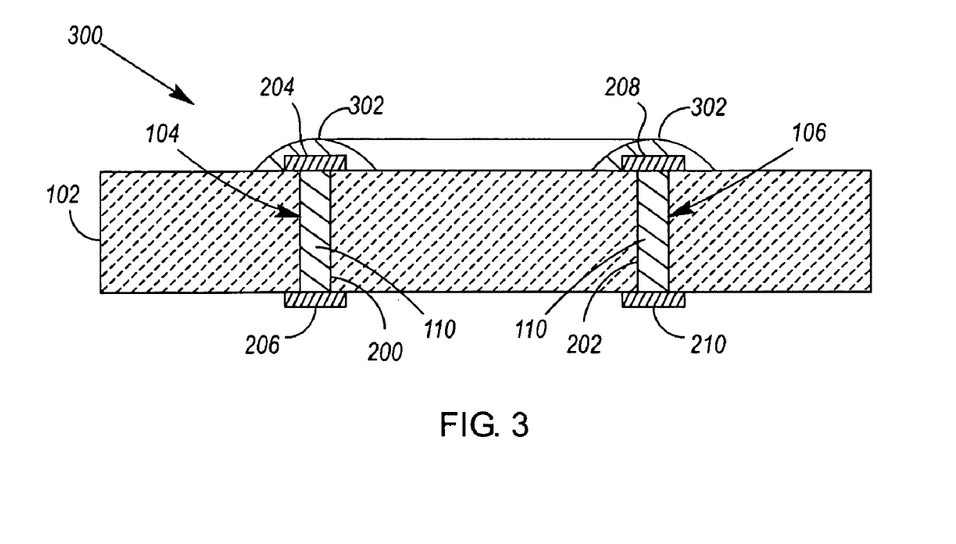
FIG. 3 is a cross-sectional view of a convex, circular-shaped concentric curvilinear heater resistor.
Figure 4:
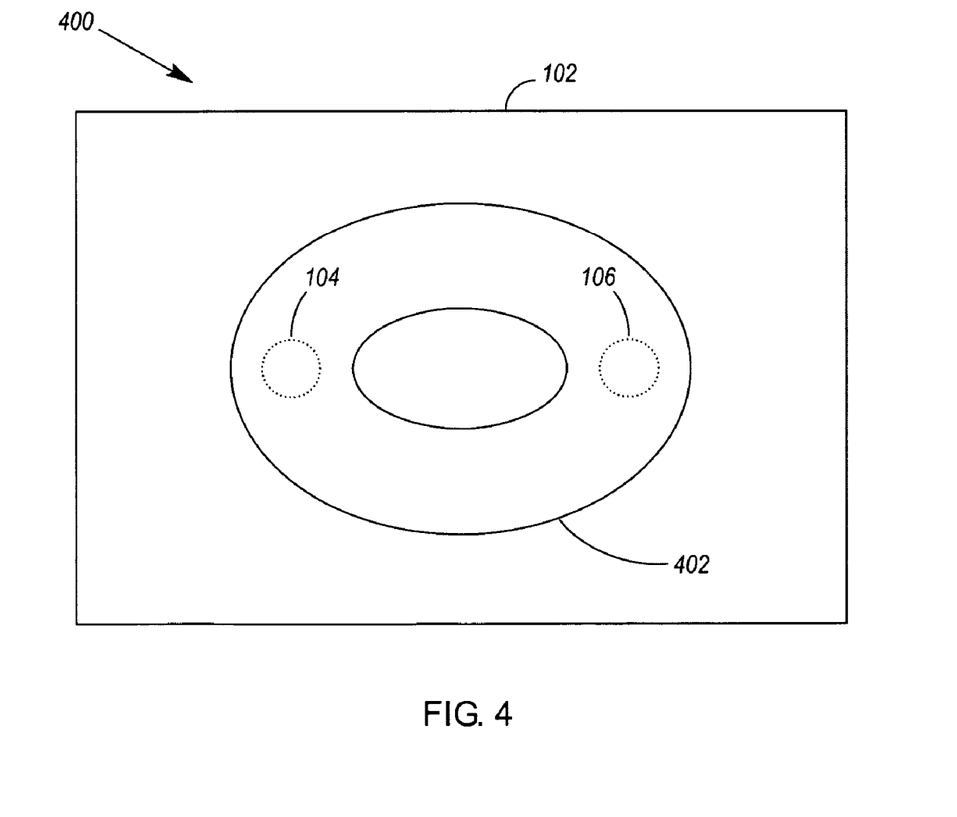
FIG. 4 illustrates an exemplary plan view of an oval-shaped concentric curvilinear heater resistor.

Referring to FIGS. 1 and 2, heater resistor 108 is shown having a concentric, curvilinear shape. Throughout this description and every description disclosed herein, by "concentric" it is meant that the heater resistor 108 has a common center. Throughout this description and every description disclosed herein, by "curvilinear" it is meant that the shape of the heater resistor 108 is formed or enclosed by curved lines. As one example of a curvilinear shape of the heater resistor 108, a circular-shaped concentric curvilinear heater resistor is shown in FIG. 1. A circular dome-shaped concentric curvilinear heater resistor 302 is shown in FIG. 3. An oval-shaped concentric curvilinear heater resistor 402 is shown in FIG. 4. There are several advantages to using a concentric curvilinear shape of the heater resistor 108 and in particular, with respect to the field of LIMMS manufacture. One advantage to using a curvilinear shape of the heater resistor 108 is that it can provide better thermal characteristics due to the radial direction of tension forces as compared to the axial direction of tension forces that occur in the standard rectangular design of a heater resistor. This configuration can increase the mechanical strength of the heater resistor and can reduce the likelihood of resistor cracking. Further, the curvilinear shape of the heater resistor 108 can provide higher efficiency at higher power levels and shorter pulses, since the shorter pulses will minimize the heat transfer time between the resistor material and the circuit substrate. Yet another advantage is that the curvilinear shape can contribute to the cooling of the apparatus 100 after completion of the drive pulse. That is, a faster temperature decrease occurs following the completion of the drive pulse due to the greater resistor to fluid contact area, the radial dispersion of heat to the surrounding material and consequential reduction of residual heat in the substrate 102 and the heater resistor 108. Still yet another advantage to using a curvilinear shape of heater resistor 108 is that a reduction in contact (parasitic) interface between the heater resistor 108 and the substrate 102 can be achieved. In the case of LIMMS manufacture, this reduction in contact (parasitic) interface allows for a higher concentration of surface current flow through the heater resistor 108, which enables the curvilinear heater resistor apparatus 100 to reach the peak temperature needed for switching with less power, when compared to the conventional rectangular heater resistor. This, in turn, provides heat relief to the entire LIMMS switch system and increased strength, reliability and life-cycle times of the switch.

Figure 5:
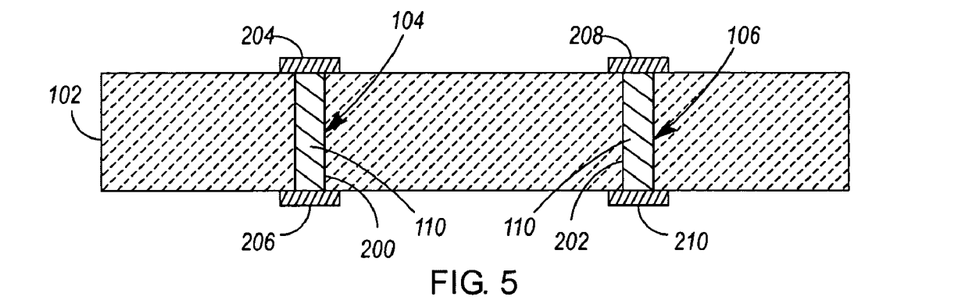
FIGS. 5 and 6 illustrate a thick-film method of producing the concentric curvilinear heater resistor of FIG. 1.
Figure 6:
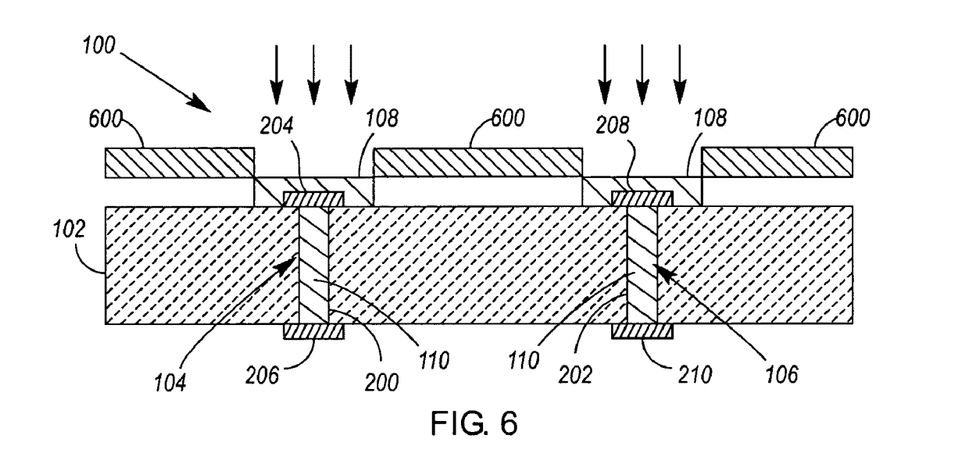
Figure 7:
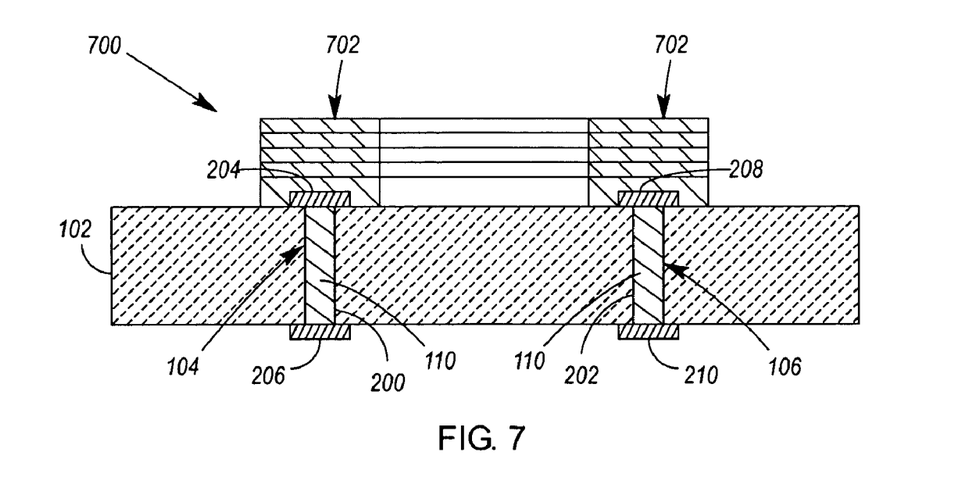
FIG. 7 is a cross-sectional view of a thick-film, multi-layer concentric curvilinear heater resistor.

Referring to FIGS. 1, 2, and 5–7, a thick-film method of producing a concentric curvilinear heater resistor will now be described. Referring to FIG. 5, substrate 102 may be comprised of any material capable of sustaining high heat resistance such as mulite, LTCC, aluminum nitride, alumina, silica and glass. Mulite, LTCC or alumina are preferred in some embodiments because of their low thermal conductivities and RF electrical properties (good dielectric constant). First and second electrical contacts 104 and 106 consisting of first hole or via 200 and a second hole or via 202 are mounted to substrate 102. The first and second holes or vias 200, 202 are punched or laser-drilled into the substrate 102 while the substrate 102 is in a "green tape" state. First via 200 and second via 202 are filled with a metallic paste 110 suitable for exposure to high temperatures. The metallic paste 110 may be comprised of silver, tungsten or platinum. Tungsten is preferred in some embodiments because of its good electrical conductivity. First via 200 and second via 202 are capped above and below substrate 102 with a minimally resistive material 204, 206, 208, 210 such as platinum or nickel. Platinum is preferred because it is compatible with the liquid metal that it interfaces with. Referring now to FIG. 6, a patterned screen 600 capable of printing a desired shape of heater resistor 108, in this case a concentric curvilinear shape, is then deposited on substrate 102. Heater resistor 108 is next deposited through the screen 600 such that when the screen 600 is removed, a patterned shape, in this case a concentric curvilinear shape, of heater resistor 108 remains on the substrate 102. Heater resistor 108 comprises a thick-film resistive material such as platinum, a mixture of platinum, palladium and silver, gold, or a DuPont™—1700 series thick-film. Platinum is preferred in some embodiments because it is compatible with the liquid metal that it interfaces with. A particular degree of resistance of the heater resistor 108 may be achieved by sizing the thickness of the heater resistor 108 printed on the substrate 102 in consideration with the amount of surface area on the substrate 102 to be covered. Lastly, the substrate 102, now including the printed thick-film heater resistor 108, is baked or "fired" at a high temperature of about 850° C. Referring to FIG. 7, the concentric curvilinear heater resistor 702 may comprise multiple thick-film layers by printing one layer of the heater resistor 702 on the substrate 102 and then drying it, and then printing and drying successive layers before ultimately baking or "firing" all of the layers at a high temperature (e.g., 850° C.).

Figure 8:
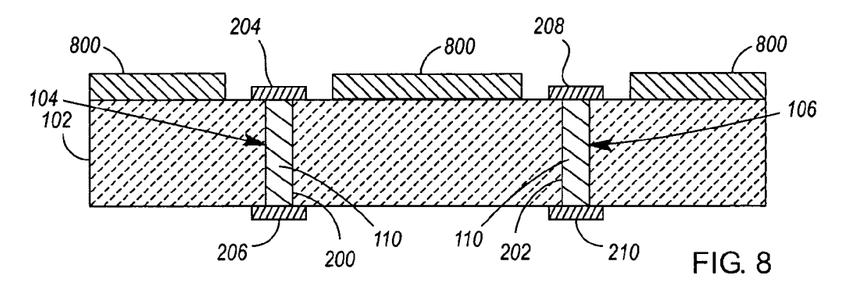
FIG. 8 illustrates a thin-film method of producing the concentric curvilinear heater resistor of FIG. 1.

A thin-film method of producing a concentric curvilinear heater resistor will now be described. As shown in FIGS. 1, 2 and 8, a substrate 102 is provided. Substrate 102 may comprise mulite, LTCC, aluminum nitride, alumina, silica and glass. Mulite or LTCC are preferred in some embodiments because of their low thermal conductivities and RF electrical properties (good dielectric constant). First via 200 and second via 202 are filled with a metallic paste 110 suitable for exposure to high temperatures. The metallic paste 110 may be comprised of silver, tungsten or platinum. Tungsten is preferred in some embodiments because of its good electrical conductivity. First via 200 and second via 202 are capped above and below substrate 102 with a minimally resistive material 204, 206, 208, 210 such as platinum or nickel. Platinum is preferred because it is compatible with the liquid metal that it interfaces with. Formation of first via 200 and second via 202 may be identical to that described in the method of producing a thick-film concentric curvilinear heater resistor set forth above. The heater resistor 108 is deposited according to the thin-film process as briefly described herein. Referring to FIG. 8, a photo-resist 800 is deposited on substrate 102 by placing a patterned mask (not shown) on substrate 102 and providing light-source exposure (not shown) to the mask. Unwanted portions of the mask are removed through light-source exposure, leaving the photo-resist 800. The photo-resist 800 is then hard-baked to prepare for deposition of heater resistor 108. Heater resistor 108 (not shown in FIG. 8) may be deposited on substrate 102 and the photo-resist 800 by sputtering or evaporation techniques, after which the remaining portions of the photo-resist 800 are removed. The thickness of the deposited heater resistor 108 may be on the order of approximately a few thousand Angstroms. The heater resistor 108 may comprise tantalum nitride, platinum or tungsten. Tantalum nitride is preferred in some embodiments because of its superior thermal response characteristic and high-temperature durability.

Given that fluid-based switch manufacture, including the manufacture of liquid metal micro switches (LIMMS), is one potential and intended application for the concentric curvilinear heater resistor of FIGS. 1–8, some exemplary fluid-based switches comprising the concentric curvilinear heater resistor will now be described.

Figure 9:
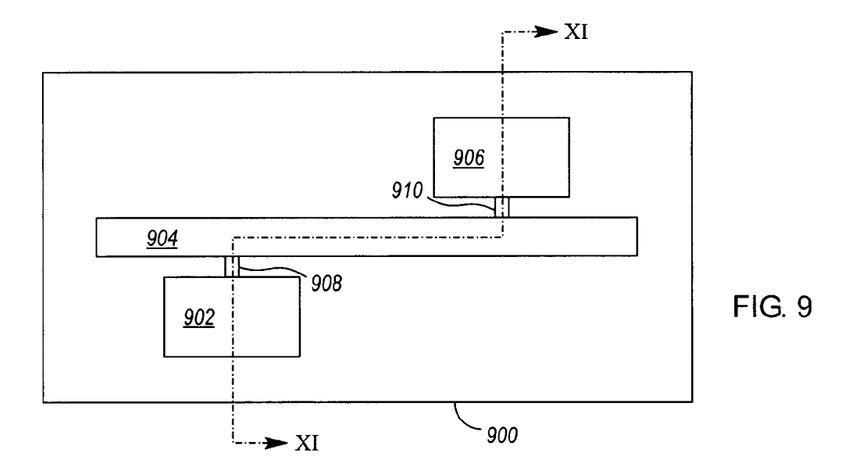
FIG. 9 is an exemplary plan view of a first substrate for a switch.
Figure 10:
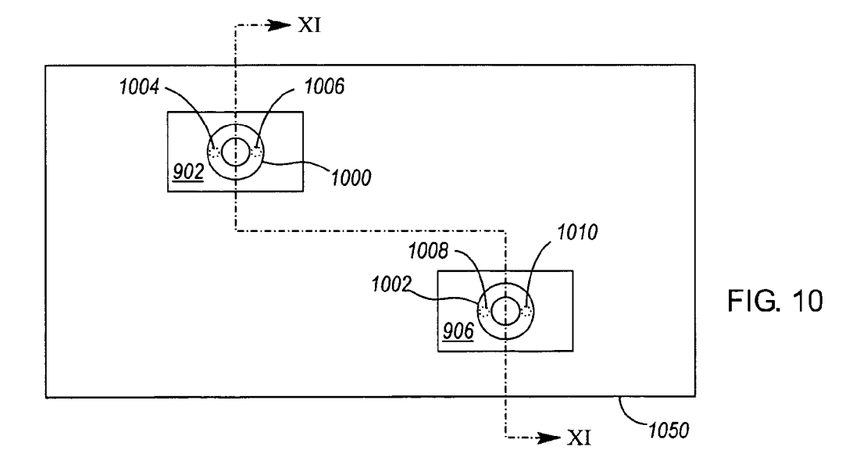
FIG. 10 is an exemplary plan view of a second substrate for a switch.
Figure 11:
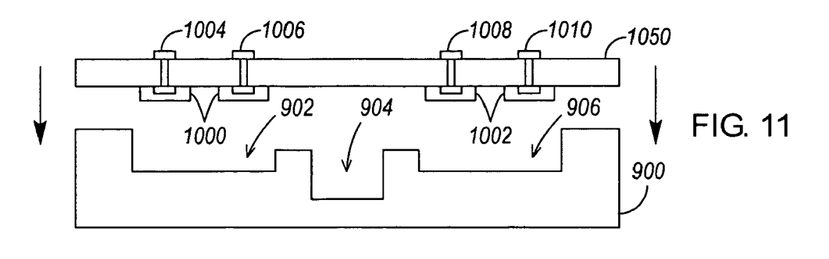
FIG. 11 illustrates exemplary cross-sectional views of the FIGS. 9 and 10 substrates as they are mated to form a switch.
Figure 12:
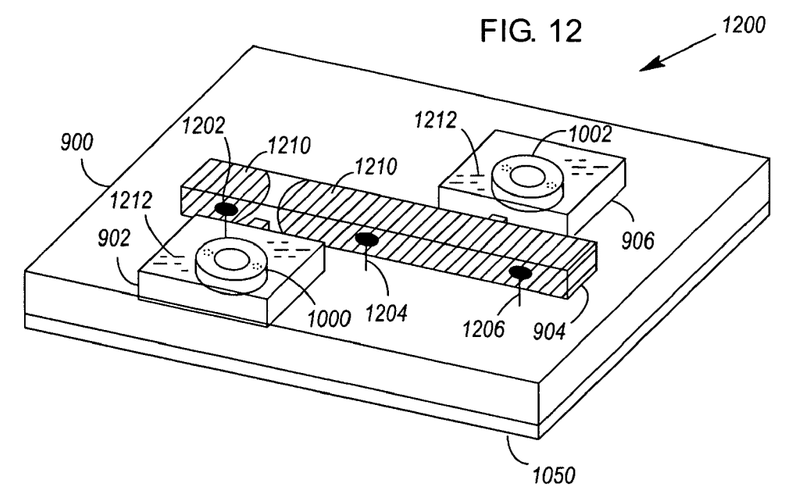
FIG. 12 illustrates a first exemplary embodiment of a switch comprising a concentric curvilinear heater resistor.

FIG. 12 illustrates a first exemplary embodiment of a switch 1200. Referring to FIG. 12, the switch 1200 comprises a first substrate 900 as shown in FIG. 9 and a second substrate 1050 as shown in FIG. 10 and when mated together as shown in FIG. 11 the first substrate 900 and the second substrate 1050 comprise a number of reservoirs or cavities 902, 904, 906, 908, 910 formed therein. For the purpose of this description, "cavity" is defined to be any sort of groove, trough, pit or other feature that creates a recess extending below the uppermost surface of a substrate. Referring to FIG. 10, a first concentric curvilinear heater resistor 1000 is deposited on a second substrate 1050 comprising a first electrical contact 1004 and a second electrical contact 1006. First concentric curvilinear resistor 1000 is coupled between first and second electrical contacts 1004, 1006. Referring to FIG. 11, first concentric curvilinear heater resistor 1000 is located at a position on second substrate 1050 such that when first substrate 900 and second substrate 1050 are coupled, first concentric curvilinear heater resistor 1000 fits within cavity 902 of first substrate 900. A similar configuration between a second concentric curvilinear heater resistor 1002, second substrate 1050, and third and fourth electrical contacts 1008, 1010 is located at a position on second substrate 1050 such that when first substrate 900 and second substrate 1050 are coupled, second concentric curvilinear heater resistor 1002 fits within cavity 906 of first substrate 900.

Referring to FIG. 12, exposed within cavity 904 is a plurality of electrodes 1202, 1204, 1206. A switching fluid 1210 (e.g., a conductive liquid metal such as mercury) held within one or more of the cavities serves to open and close at least a pair of the plurality of electrodes 1202–1206 in response to forces that are applied to the switching fluid 1210. An actuating fluid 1212 (e.g., an inert gas or liquid) held within one or more of the cavities serves to apply the forces to the switching fluid 1210. In the embodiment shown in FIG. 12, actuating fluid 1212 is located in cavities 902 and 906.

In one embodiment of the switch 1200, the forces applied to the switching fluid 1210 result from pressure changes in the actuating fluid 1212. The pressure changes in the actuating fluid 1212 impart pressure changes to the switching fluid 1210, and thereby cause the switching fluid 1210 to change form, move, part, etc. In FIG. 12, the pressure of the actuating fluid 1212 held in actuating fluid cavity 902 applies a force to part the switching fluid 1210 as illustrated. In this state, the rightmost pair of electrodes 1204, 1206 of the switch 1200 is coupled to one another. If the pressure of the actuating fluid 1212 held in cavity 902 is relieved, and the pressure of the actuating fluid 1212 held in cavity 904 is increased, the switching fluid 1210 can be forced to part and merge so that electrodes 1204 and 1206 are decoupled and electrodes 1202 and 1204 are coupled.

By way of example, pressure changes in the actuating fluid 1212 may be achieved by means of heating the actuating fluid 1212 with the heater resistors 1000, 1002. This process is described in more detail in U.S. Pat. No. 6,323,447 of Kondoh et al. entitled "Electrical Contact Breaker Switch, Integrated Electrical Contact Breaker Switch, and Electrical Contact Switching Method," which is hereby incorporated by reference for all that it discloses. Other alternative configurations for a fluid-based switch are disclosed in U.S. Pat. No. 6,750,594 of Marvin Wong entitled "Piezoelectrically Actuated Liquid Metal Switch," which is also incorporated by reference for all that it discloses. Although the above-referenced patents disclose the movement of a switching fluid by means of dual push/pull actuating fluid cavities, a single push/pull actuating fluid cavity might suffice if significant enough push/pull pressure changes could be imparted to a switching fluid from such a cavity.

Additional details concerning the construction and operation of a switch, such as that which is illustrated in FIG. 12, may be found in the aforementioned patents of Kondoh, et al. and Marvin Wong.

Figure 13:
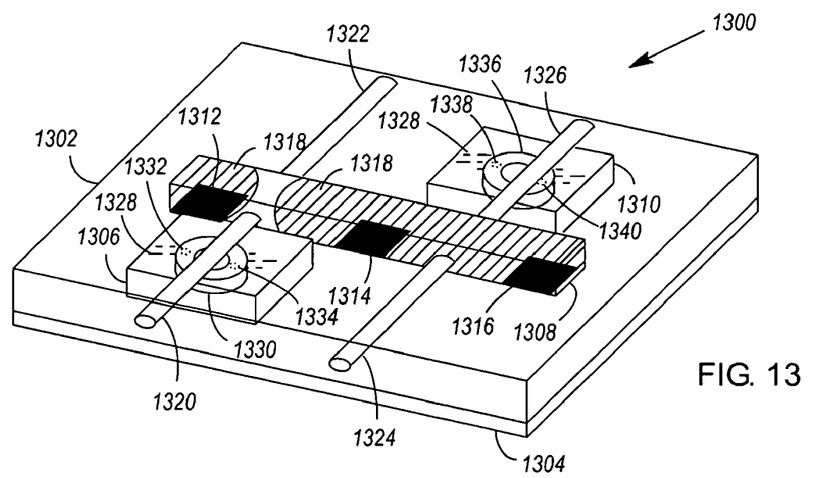
FIG. 13 illustrates a second exemplary embodiment of a switch comprising a concentric curvilinear heater resistor.

FIG. 13 illustrates a second exemplary embodiment of a switch 1300. The switch 1300 comprises a first substrate 1302 and a second substrate 1304 mated together. The substrates 1302 and 1304 define between them a number of reservoirs or cavities 1306, 1308, 1310. Exposed within one or more of the cavities are a plurality of wettable pads 1312, 1314, and 1316. A switching fluid 1318 (e.g., a liquid metal such as mercury) is wettable to the pads 1312, 1314, 1316 and is held within one or more of the cavities. The switching fluid 1318 serves to open and block light paths 1320/1322, 1324/1326 through one or more of the cavities, in response to forces that are applied to the switching fluid 1318. By way of example, the light paths may be defined by waveguides 1320/1322, 1324/1326 that are aligned with translucent windows in the cavity 1308 holding the switching fluid 1318. Blocking of the light paths 1320/1322, 1324/1326 may be achieved by virtue of the switching fluid 1318 being opaque. An actuating fluid 1328 (e.g., an inert gas or liquid) held within one or more of the cavities serves to apply the forces to the switching fluid 1318.

A thin-film first concentric curvilinear heater resistor 1330 is deposited on a second substrate 1304. First concentric curvilinear heater resistor 1330 is coupled between a first electrical contact 1332 and a second electrical contact 1334. The first concentric curvilinear heater resistor 1330 is located within cavity 1306. A similar configuration between a thin-film second concentric curvilinear heater resistor 1336, second substrate 1304, and a third electrical contact 1338 and a fourth electrical contact 1340 is located at a position on second substrate 1304 such that when first substrate 1302 and second substrate 1304 are coupled, second curvilinear heater resistor 1336 fits within cavity 1310.

Forces may be applied to the switching and actuating fluids 1318, 1328 in the same manner that they are applied to the switching and actuating fluids 1210, 1212 in FIG. 12. By depositing thin-film concentric curvilinear heater resistors 1330, 1336, the interface between the concentric curvilinear heater resistors 1330, 1336 and the second substrate 1304 is reduced thereby decreasing the amount of thermal energy lost to the substrate 1304 and consequently, transferring more thermal energy to the actuating fluid 1328.

As mentioned elsewhere in the description, concentric curvilinear heater resistors as described herein may be implemented in other technologies besides LIMMS wherein a thermal actuator or situation wherein a heater resistor heats a fluid is required. One such technology is the thermal ink jet technology.

Figure 14:
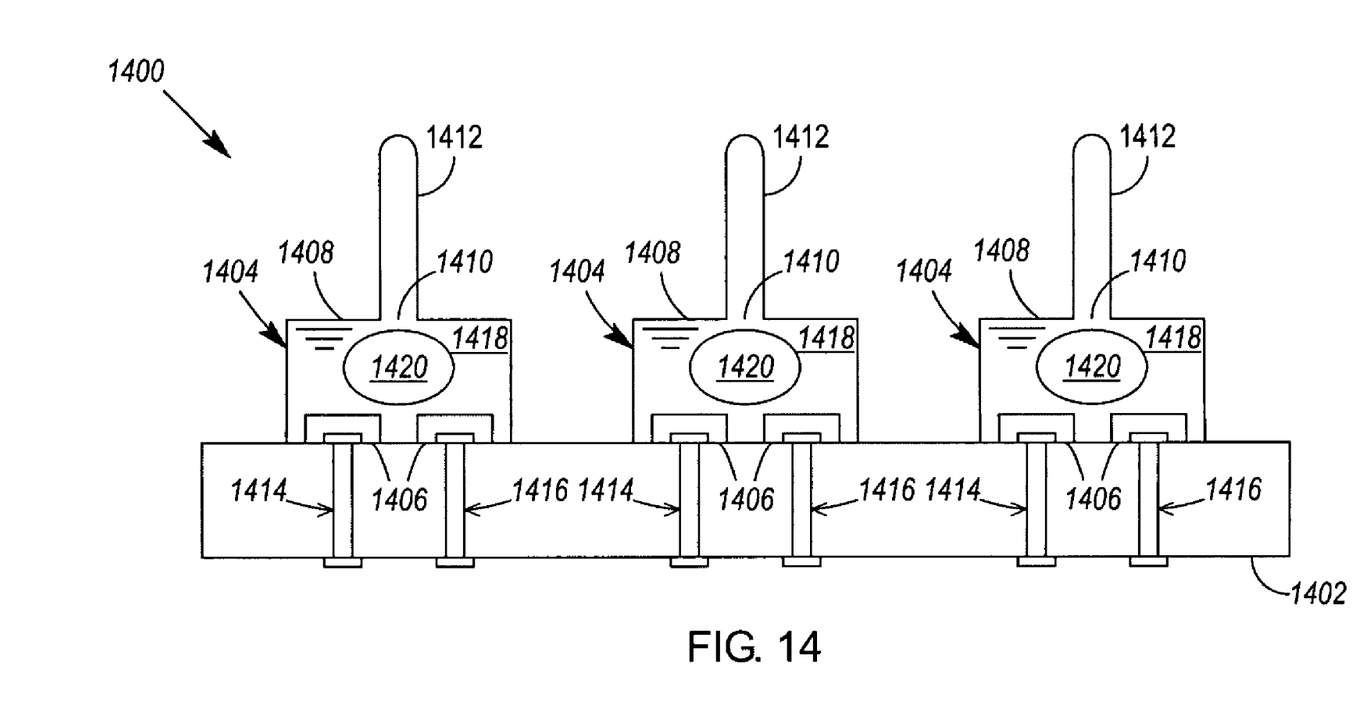
FIG. 14 illustrates an exemplary embodiment of an ink cartridge comprising a concentric curvilinear heater resistor.

Referring to FIG. 14, a cross-sectional view of an ink cartridge apparatus 1400 comprising a plurality of ink reservoirs 1404 and a plurality of concentric curvilinear heater resistors 1406 for ejecting ink are shown. Within an outer nozzle plate are mounted a plurality of ink reservoirs 1404 comprising a housing 1408 with an opening or ink jet orifice 1410. Operatively connected to the ink ejection orifice 1410 is an ink ejection channel 1412. A first electrical contact 1414 and a second electrical contact 1416 are mounted within each ink reservoir 1404. A concentric curvilinear heater resistor 1406 is coupled to each first electrical contact 1414 and each second electrical contact 1416 within each ink reservoir 1404. As shown in FIG. 14, the concentric curvilinear heater resistor 1406 may be mounted on a substrate 1402 over which housing 1408 may be placed to form an ink reservoir 1404. Alternately, the concentric curvilinear heater resistor 1406 might be mounted to an interior wall of housing 1408 before housing 1408 is sealed to substrate 1402, or elsewhere within the ink reservoir 1404. Each concentric curvilinear heater resistor 1406 is surrounded by a quantity of ink 1418 located in each ink reservoir 1404. When concentric curvilinear heater resistor 1406 is heated, a vapor bubble 1420 forms within ink reservoir 1404. Vapor bubble 1420 displaces a quantity of ink 1418 in contact with concentric curvilinear heater resistor 1406 located in ink reservoir 1404. Displaced quantity of ink 1418 moves along a displacement path through ink ejection orifice 1410 into ink ejection channel 1412 from which it is expelled in the direction of the medium onto which ink 1418 is to be printed.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A switch, comprising:
   first and second mated substrates defining there between at least portions of a number of cavities;
   a switching fluid, held within one or more of the cavities, that is moveable between at least first and second switch states in response to forces that are applied to the switching fluid;
   an actuating fluid, held within one or more of the cavities, that applies the forces to the switching fluid;
   first and second electrical contacts supported by the second of the mated substrates; and
   a concentric curvilinear heater resistor, deposited on the second substrate and coupling the first and second electrical contacts, the concentric curvilinear heater resistor contacting the actuating fluid within one of the cavities that hold the actuating fluid.

2. The switch of claim 1, wherein the concentric curvilinear heater resistor is circular-shaped.

3. The switch of claim 1, wherein the concentric curvilinear heater resistor is oval-shaped.

4. The switch of claim 1, wherein the concentric curvilinear heater resistor has a domed cross-section.

5. The switch of claim 1, wherein the actuating fluid is of a type that expands when heated.

6. The switch of claim 1, wherein the concentric curvilinear heater resistor comprises a thick-film resistive material.

7. The switch of claim 1, wherein the concentric curvilinear heater resistor comprises a thin-film resistive material.

8. The switch of claim 1, wherein the concentric curvilinear heater resistor comprises multiple thick-film layers.

9. The switch of claim 1, wherein the second of the mated substrates comprises mulite.

10. The switch of claim 1, wherein the second of the mated substrates comprises a low temperature co-fired ceramic.

11. The switch of claim 1, wherein the concentric curvilinear heater resistor comprises platinum.

12. The switch of claim 1, wherein the concentric curvilinear heater resistor comprises tantalum nitride.

13. The switch of claim 1, wherein the actuating fluid comprises an inert gas.

14. The switch of claim 1, wherein the switching fluid comprises a conductive liquid metal.

15. The switch of claim 14, wherein the actuating fluid comprises an inert gas.

16. The switch of claim 1, wherein the switching fluid comprises mercury.

* * * * *